(12) United States Patent
Manfredi et al.

(10) Patent No.: US 8,458,336 B2
(45) Date of Patent: Jun. 4, 2013

(54) STATE MACHINE EVENT RESTORATION

(75) Inventors: Raphael Manfredi, Grenoble (FR); Pierre Fouche, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1658 days.

(21) Appl. No.: 11/411,997

(22) Filed: Apr. 25, 2006

(65) Prior Publication Data
US 2007/0003347 A1 Jan. 4, 2007

(30) Foreign Application Priority Data
Apr. 25, 2005 (EP) ..................................... 05300314

(51) Int. Cl.
G06F 15/16 (2006.01)
G06F 17/00 (2006.01)

(52) U.S. Cl.
USPC ............................ 709/227; 707/607; 707/703

(58) Field of Classification Search
USPC .................. 709/203, 227–229; 707/607, 703, 707/E17.041
See application file for complete search history.

(56) References Cited

U.S. PATENT DOCUMENTS

| | | | | |
|---|---|---|---|---|
| 5,930,792 A * | 7/1999 | Polcyn | ........................... | 715/234 |
| 6,038,596 A * | 3/2000 | Baldwin et al. | ................ | 709/219 |
| 6,098,093 A * | 8/2000 | Bayeh et al. | ................... | 709/203 |
| 6,237,035 B1 * | 5/2001 | Himmel et al. | ................ | 709/224 |
| 6,323,881 B1 * | 11/2001 | Broulik et al. | ................ | 715/744 |
| 6,618,851 B1 * | 9/2003 | Zundel et al. | ................. | 717/103 |
| 6,725,252 B1 * | 4/2004 | Mall et al. | ...................... | 709/203 |
| 6,757,900 B1 * | 6/2004 | Burd et al. | ..................... | 719/316 |
| 6,976,259 B1 * | 12/2005 | Dutta et al. | .................... | 719/310 |
| 7,171,663 B2 * | 1/2007 | Moore et al. | ........................ | 718/1 |
| 7,376,741 B1 * | 5/2008 | Carter et al. | .................. | 709/228 |
| 7,496,916 B2 * | 2/2009 | Dettinger et al. | ............. | 718/100 |
| 2002/0080200 A1 | 6/2002 | Wong et al. | ................... | 345/969 |
| 2002/0165971 A1 * | 11/2002 | Baron | .......................... | 709/228 |
| 2003/0046291 A1 * | 3/2003 | Fascenda | ........................ | 707/10 |
| 2003/0050813 A1 * | 3/2003 | Cohen et al. | ....................... | 705/7 |
| 2003/0079039 A1 * | 4/2003 | Forkner et al. | ................ | 709/237 |
| 2003/0187995 A1 * | 10/2003 | Fok et al. | ...................... | 709/227 |
| 2004/0111729 A1 * | 6/2004 | Moore et al. | ................... | 719/318 |

(Continued)

FOREIGN PATENT DOCUMENTS

GB 2 355 904 A 5/2001

OTHER PUBLICATIONS

David Chandler, "Controlling Page Sequencing with an Event-Driven State Machine", CodeFUsion Developer Journal, Oct. 2004.*

(Continued)

Primary Examiner — Shirley Zhang
(74) Attorney, Agent, or Firm — Richard Lloyd

(57) ABSTRACT

An interactive system, such as a webserver, is described of the type wherein responses to a user are associated with states of a state machine, the responses being generated as a result of a transition into a state associated with the response, the system comprising a state machine controller arranged to change states of the state machine according to the processing of user-initiated events. To provide for handling of concurrent events, the state machine controller is arranged, during processing of a current event, to determine whether the current event was initiated at an earlier time than another event and, if so, (i) restore the state machine to a condition consistent with that immediately prior to processing of the current event, and then (ii) carry out a state transition according the other event.

6 Claims, 4 Drawing Sheets

U.S. PATENT DOCUMENTS

| | | | |
|---|---|---|---|
| 2004/0158549 A1* | 8/2004 | Matena et al. | 707/1 |
| 2004/0260651 A1* | 12/2004 | Chan et al. | 705/50 |
| 2005/0262098 A1* | 11/2005 | Manfredi et al. | 707/10 |
| 2007/0038756 A1* | 2/2007 | Waldorf et al. | 709/227 |

OTHER PUBLICATIONS

"The Pearl module CGI:MxScreen", retrieved Jul. 5, 2004 from http://search.cpan.org/~ram/CGI-MxScreen-0.1.1/MxScreen.pm.

"Server-side MVC Architecture Part 3: Clents, Transactions and Exceptions", retrieved Nov. 5, 2004 from http://www.uidesign.net/2000/papers/webmvcla.html.

"Server-side MVC Architecture—Part 1" retrieved Nov. 5, 2004 from http://www.uidesign.net/1999/papers/webmvc_part1.html.

"Server-side MVC Architecture—Part 2", retrieved Nov. 5, 2004 from http://www.uidesign.net/1999/papers/webmvc_part2.html.

UML Semantics, retrieved Oct. 12, 2004 from http://etna.int-evry.fr/cours/uml/semantics/>.

Mohan, R., et al."A State Machine Based Approach for a Process Driven Development of Web-Applications", Lecture Notes in Computer Science, vol. 2348, pp. 52-66, (2002).

Rumbaugh, J., "State Trees as Structured Finite State Machines for User Interfaces", Proceedings of the ACM SIGGRAPH Symposium on User Interface Software, pp. 15-29 (1988).

"Using MVC Pattern in Web Interactions", pp. 1-22, retrieved Jul. 22, 2000 from http://www.uidesign.net/Articles/Papers/WebMVC-BrowsersTransactio.html>.

"A State Machine Engine for Web MVC" retrieved Dec. 14, 2004 from http://www.uidesign.net/articles/Papers/AStateMachineEngineforV.

"Web MVC Browsers, Transactions and Exceptions", retrieved Dec. 14, 2004 from http://www.uidesign.net/Articles/Papers/WebMVC-BrowsersTransaction.

M. L. Bustamante, "Finite State Machines, Wizards, and the Web," Microsoft MSDN Library, Feb. 2004, 26 p.

HPDC, EPC action dated Jul. 18, 2007, EP App. No. 05 300 314.1, 5 p.

HPDC, Response/Amendment filed Jan. 25, 2008 to EPC action dated Jul. 18, 2007, 18 p.

* cited by examiner

STATE MACHINE EVENT RESTORATION

BACKGROUND OF THE INVENTION

The HTML, or other, code that makes up each web page on the World Wide Web is commonly dynamically generated by an event-driven program that is running on server hardware. This type of program is known as a web application. In the following, the terms "web server" will be used to refer to the logical entity that provides a web page in response to an http request and "web application" to the set of components that provide this function using general-purpose computing platforms within general-purpose operating environments such as are provided by the Microsoft Windows, Linux or HP-UX operating systems and their related programming libraries and tools.

Web applications are generally event-driven interactive systems which react to HTTP requests from the client, the http request being directed to a web address (a URL). The web application will generate and return a web page to the browser. The difference between this type of arrangement and a simple "static" site is that each action the user takes can have some semantics associated with it. In other words, the resulting web page can differ according to the user, the current time or other factors prevailing in the system.

When the web application receives an event, it is arranged to evaluate the received event and decide how to respond to the client. This evaluation process may involve interaction with business logic of some kind. The interaction with the business logic can take place independently of the screen design or user interface and often involves transactions with back-end systems, such as remote databases.

Web servers typically provide for user sessions which enable session data relating to a series of http requests from a single user to be retained on the server. A modern production web server would normally be arranged to conduct a relatively large number of user sessions in parallel.

Since multiple http requests can be received at the same time by a web server, the processing of requests by a web server is inherently multi-threaded and, in most modern web servers, each request is normally processed by a separate thread or process, depending on the design.

A state machine may be used for controlling a web application. Where a state machine is used to control the web application, each user session will normally have a single state machine instance that will only be affected by http requests pertaining to that session. However some protection of the state machine data for each session must be put in place to avoid concurrency problems due to access by multiple threads processing separate events from the same session, corresponding, for instance, to multiple mouse clicks from a single user. The simplest approach to this is would be to place a lock on the state contexts at the time the state machine starts processing an event. Using this approach, further event processing would then be disabled until processing of the event is complete.

However, it is possible in such systems that a state transition and the generation of a new web page to display may take a significant amount of time and that during that time further events may be deliberately generated by the user. For instance, before a new page can be generated, the user may change their mind as to what they want to do, or may simply lose patience. If the processing of events were to be isolated by holding a coarse-grained lock on event reception until the event is fully processed, there would be no way for a user to change their mind when they click to perform an action that takes a long time to complete: the lock would not allow a new event to be processed until the previous action has run to completion.

BRIEF DESCRIPTION OF THE DRAWINGS

An embodiment of the invention will now be described by way of example only, with reference to the following figures, wherein.

DETAILED DESCRIPTION OF THE PREFERRED EMBODIMENT

In the embodiments to be described below, a web server is described as an example of an interactive system that can be driven by a state machine. More specifically, in the embodiments described, the JavaServer Pages (JSP) technology is employed in the web server as a means to dynamically generate web pages, although it will be appreciated that any other suitable dynamic Web scripting/programming arrangement may equally be used for this. As is well known, the JSP technology uses XML-like tags to encapsulate the logic that generates the content for a web page. The application logic can reside in server-based resources (such as JavaBeans) that the page accesses via these tags.

The described embodiments make use of object-oriented programming techniques that, as will be understood by those skilled in the art, involve the definition, creation, use and destruction of objects. These objects are software entities comprising data elements and routines, or methods, which manipulate the data elements. The data and related methods are treated by the software as an entity and can be created, used and deleted as if they were a single item. Together, the data and methods enable objects to model entities in terms of their characteristics, which can be represented by the data elements, and its behavior, which can be represented by its methods. In this way, objects can model things like web pages, events, people or computers.

Objects are defined by creating "classes" which are not objects themselves, but which act as templates that instruct the compiler how to construct instances of the actual object. A class may, for example, specify the number and type of data variables and the steps involved in the methods which manipulate the data. An object is instantiated in the program by means of a special method called a constructor which uses the corresponding class definition and additional information, such as arguments provided during object instantiation, to construct the object. The Java runtime environment, for instance, deletes objects when it determines that they are no longer being used. This process is referred to as garbage collection. Objects may be used by using their data and invoking their methods.

Figure 1:
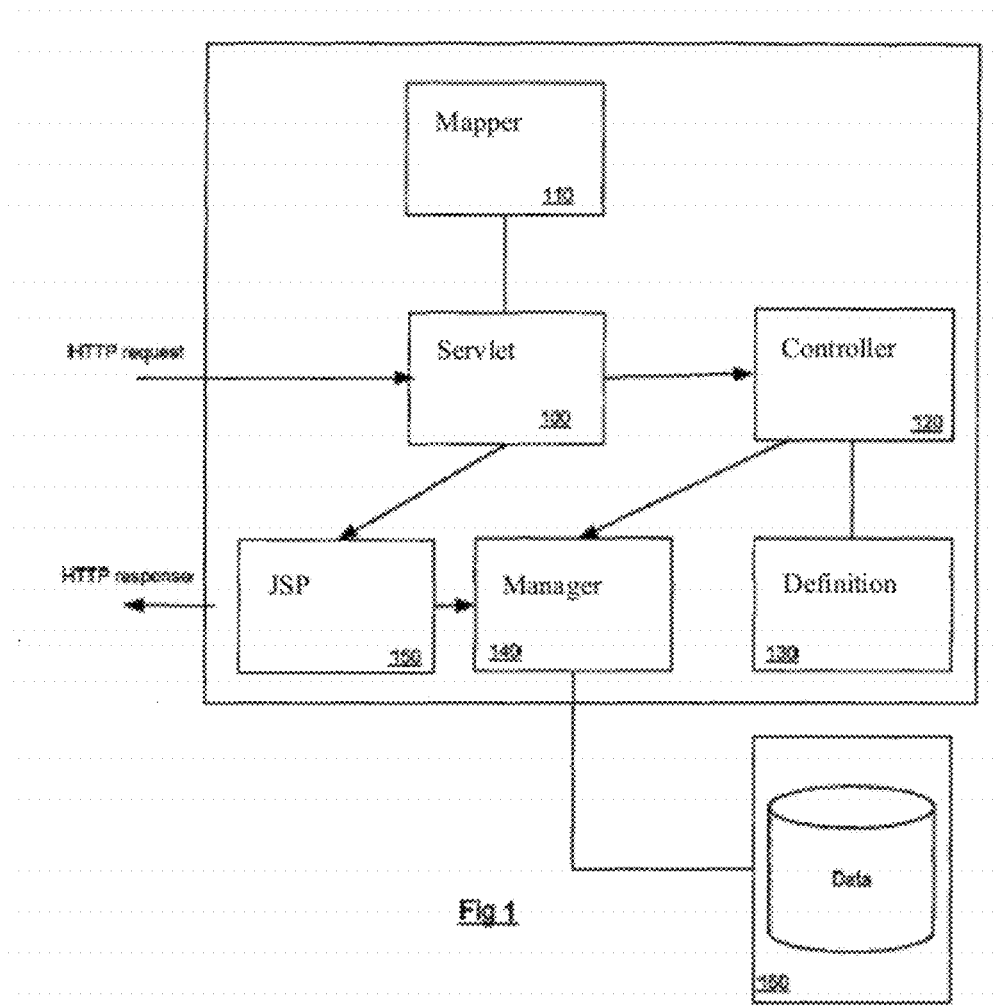
FIG. 1 is a schematic diagram showing a web application in an embodiment of the invention.

FIG. 1 illustrates a web application architecture in which a controller component is provided with a state machine. The operation of such a web application is as follows. First an incoming http request is received by a controller servlet 100 which manages application flow and logic in a manner to be described in more detail below. Event-Type mapper 110 translates the HTTP messages sent to the application server into event objects that are meaningful for the application. Then, the events are passed to a state machine controller 120 which consumes the event according to a state machine definition 130. A session manager and session controller (not shown) would also normally be present to manage user authorization in generally known manner.

The architecture also comprises one or more JSP pages 150 and one or more JavaBeans in JavaBean manager 140 that may be used for accessing external data resources illustrated at 160.

As is well known, servlets are server-side software modules that fit into a web server framework and can be used to extend its capabilities. A JavaBean is simply a building block component that can be combined with other components in the same or other computers in a distributed network to form an application. Such components can be deployed on different servers in a network and communicate with each other for needed services. The general operation of such a system will be generally well understood by those skilled in the art.

In such architectures, there is not normally any processing logic within the JSP pages themselves; they are simply static templates that are arranged to be populated by retrieving any objects or beans that may have been previously created, and extracting the dynamic content from them.

State machine definition 130 defines the flow and logic of the web application. States represent views and transitions between states represent actions. Web application developers define the states and transitions which handle request parameters, use business objects to handle business logic, and populate page beans given to a bean manager 140 to display information on pages.

The state machine used in this embodiment can contain nested states. In the state machine definition 130 each atomic state, that is each state that does not itself have sub-states, represents a screen that the user will see, with transitions among the various states representing the navigation flow between the screens. Superstates are used to encapsulate and provide transitions that are common to all of their substates and to provide boundary functions for various functional zones.

Figure 2:
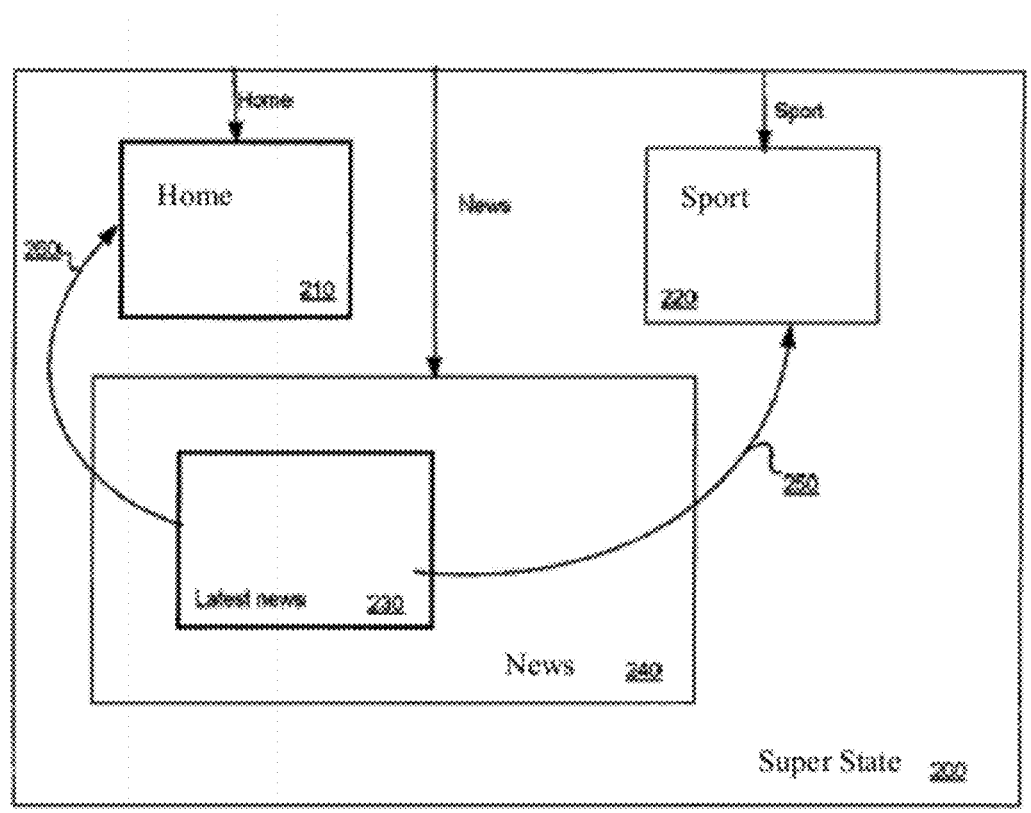
FIG. 2 is a state diagram showing the screen flow of a simple web application in one example.

To illustrate the operation of the state machine controller, FIG. 2 is a hierarchical state diagram showing a set of different application screens and how a user can go from one to another by doing which action. The diagram comprises a "Home" state 210, a "Sport" state 220 and a "Latest News" state contained within a further state 240.

Within each superstate, one substate illustrated in bold is selected as the default substate that is entered by default on entry to the superstate. This default substate can be either configured to always be the same state, or can be dynamically computed on entry to the superstate. For example, on entry to the site, the home state 210 is selected as the default state within super state 200. Thus on first entry to the site, it is the web page associated with home state 210 that is generated and displayed. Similarly, on entry to superstate 240, it is the page 230 that is generated and displayed.

It will be understood that, since the state machine is hierarchical, transitions that are illustrated as being available from a superstate are available from each of the substates within the superstate. So, for instance the "Home" event is available from each of the three atomic substates 210, 220, and 230.

When the State Machine Controller 120 receives an event, it computes the next application state based on the combination of several factors: the current state, the event received, the environment context and the set of configured transitions from the current state. Actions can be attached to the state transition that will take place, to carry out the desired business logic.

After event handling and a new application state has been determined, display of the page associated with that new state is triggered. The controller servlet 100 forwards control to JSP view generator 150 to generate an HTML web page that will be sent the client browser. JSP view generator 150 typically makes use of Javaserver pages Standard Tag Library (JSTL) to help produce the HTML. These tag libraries in turn use information stored in the page beans.

Once the page is generated, provided to the browser in an HTTP response and displayed, it presents options to the user for another interaction, and the cycle repeats itself.

Thus, in systems of the above described type, the hierarchical state machine formally describes the set of states that the application can be in, and is the main support for controlling the operations that can happen.

The operations performed between receipt of an http request and generation of a response each take some time to carry out which in some systems can result in a perceptible latency in the generation of a response.

Each state of the state machine is associated with a state context object that is equipped with callbacks that are triggered by the state machine controller when a state is entered or left. The state context object attached to a particular state is created once, the first time the state is entered, and then remains in existence throughout the session: this allows the data pertaining to the state to be stored there. The state context objects are thus normally persistent, to be able to hold contextual information across the various invocations during a session.

When a transition is made from one state to another state, several nested states may be left and then several nested states entered. As each state boundary is crossed, the corresponding leave and enter callbacks are called by the state machine controller on the associated state objects in the order described, which is defined by the actual state boundaries that are crossed during the transition. For example, in FIG. 2 if a user is in state 230 "Latest news" and then clicks on a displayed "sport" link the transition illustrated at 250 would be provoked. This transition would involve leaving states 230 and 240 and entering state 220. If in the same state 230 the user clicks on the "Home" link then the transition illustrated at 260 is provoked. This involves leaving states 230 and 240 and entering state 210.

To ensure the consistency of the state context objects, it is important to make sure that no concurrent access is made to them: since they hold model data and contextual information about the processing, it is not acceptable to have simultaneous method invocations on those objects from concurrent threads corresponding to different user-initiated events.

It will be understood that in this context, concurrent access does not normally mean two different users performing an action at the same time, since they will generally have different sessions and therefore different instantiations of the state machine. It rather means that the same user is performing concurrent actions, by opening two windows on the same application or by clicking on some link still displayed on the page after clicking on a first link and before the reply from the first action came back: the second event will be received in the middle of the processing of the first.

Generally, to avoid such consistency problems, critical sections can be defined. When the code is in a critical section, it holds a lock and other threads cannot acquire it until that lock is released. In effect, this guarantees that only one thread will be running the code in the critical section at one point in time.

The technique described here enables the size of the critical sections to be reduced, and then ensures that there will be no concurrent access to the methods held in the state contexts. As will be described in more detail below, when a concurrent request is received, the state machine is arranged to detect the concurrency by executing a small critical section and, if concurrency is detected, to then proceed by detaching the state context objects that were accessed by the earlier event—in other words breaking the link between the state and the state context object. Once the existing state contexts have been detached, the state machine controller is arranged so that entering these states will cause the creation of new associated state context objects and further operations will be carried out on those newly created context objects. The detached state context objects will be removed later by a garbage collection process.

In this way, it can be ensured that operations on a given state context object will only be made by a single thread of execution.

In addition to the above measure, when a concurrent event occurs, it is processed from the same state as the state machine was in when the earlier event was received. The state machine thus is arranged to restore that state, invoking the enter call-back on the newly created contexts, as necessary, and supplying the original event context for the restored state.

Finally, the thread that executes the old event which was interrupted will be passively cancelled when it next tries to access to state machine controller. The thread sees that it was superseded by another event and aborts execution.

In alternate embodiments, it would be possible to perform active cancellation of the concurrent thread, but in the Java-based domain of this embodiment this would not be convenient, since creation and destruction of threads is beyond the control of the state machine controller.

The above described techniques ensure that the state contexts that can be the targets of calls during the event processing will be properly detached when a concurrent event is received. In this embodiment, the existing context of execution in all the states that were involved in the processing of the "interrupted" event will be lost, although it will be understood that in other embodiments it would be possible to back up and restore the contexts of all the visited states, if required, depending on the storage resources available.

Each event received by the state machine controller is assumed to be numbered sequentially or otherwise time-stamped and this data is stored and available during all processing linked with the event; the initial state of the state machine at the time the event is received is stored; Each state context that is entered or left during the processing of the event is recorded, for example, in a visited states list.

In this way, the complexity of the concurrency management is managed within a state machine controller, potentially freeing a programmer who may define the state contexts and the action logic associated with state transitions from having to implement it.

Figure 3:
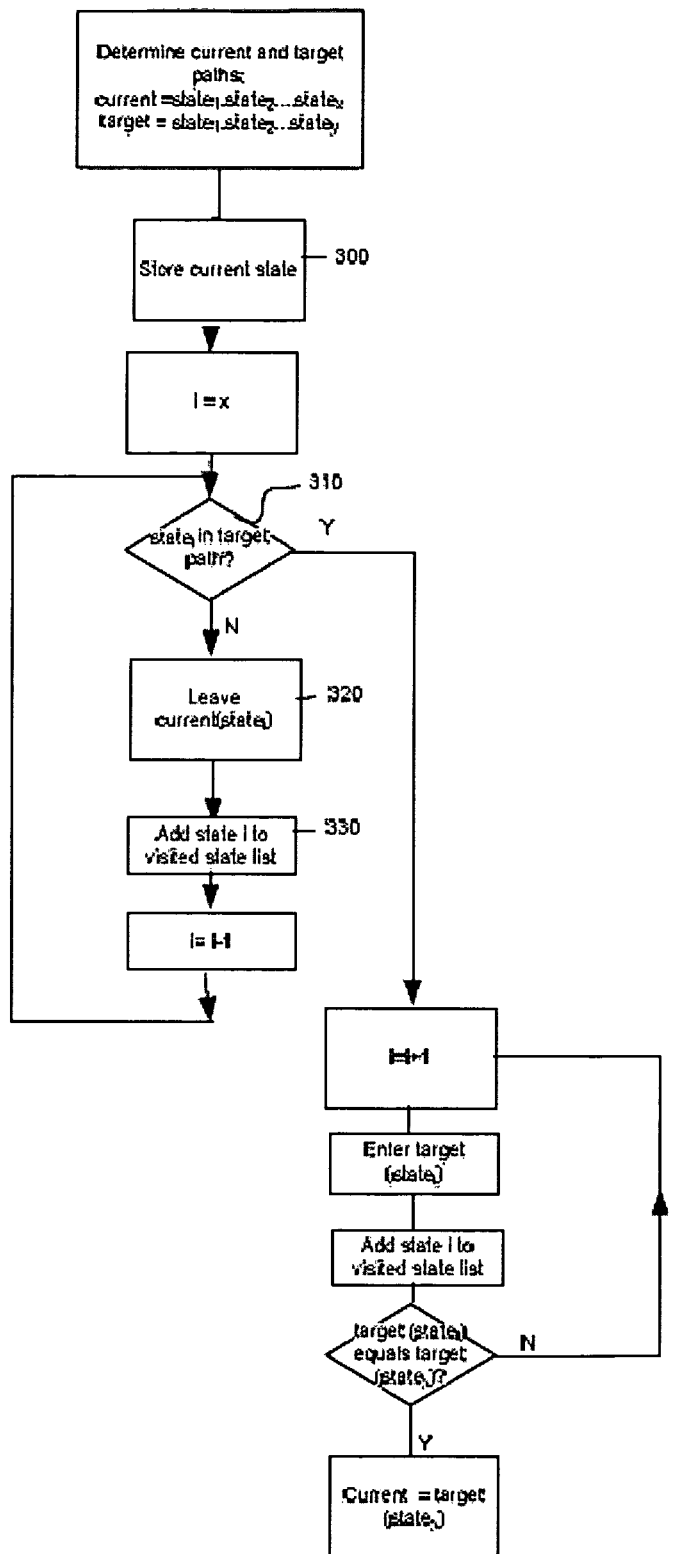
FIG. 3 is a simplified flow diagram showing the processing of a state transition.

An example of a simplified algorithm that may be used by the state machine controller to carry out these steps is shown in FIG. 3. Consider a transition from statex to statey. First the full path of statex and statey are calculated. This results in lists of all states from the root state to statex and statey respectively. The current state is stored—step 300 It is then determined in step 310 whether the current state lies in the path of the target state in step 310, if not then the leave method is carried out on the current state in step 320 and the state is added to a visited state list—step 330. This process is repeated until a state is reached that does lie in the path of the target state. The enter methods of states in the target path are then repeatedly called until the target statey is reached and each state visited is added to the visited state list. The target state statey is then set as the current state.

FIG. 4 illustrates a second element of the method.

Figure 4A:
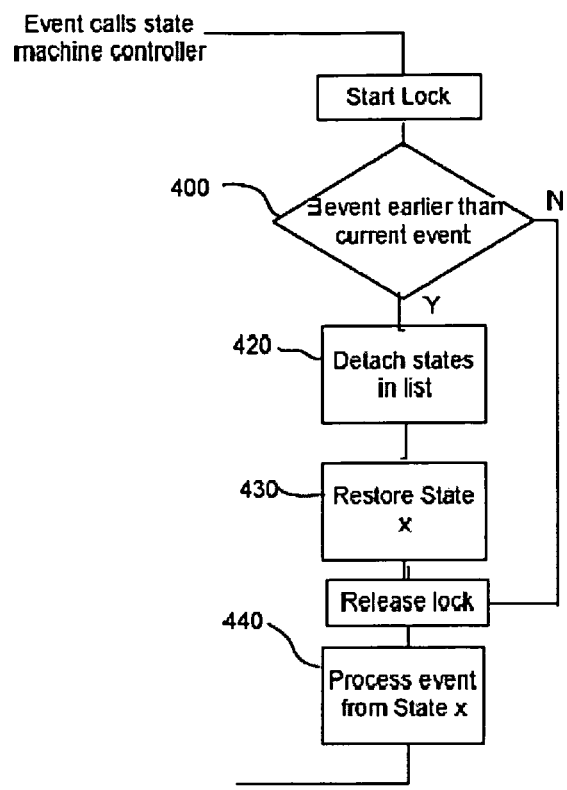
FIGS. 4*a* and 4*b* are a simplified flow diagrams showing the processing of calls to a state machine controller.

As shown in FIG. 4(a), the first time a thread processing an event makes a call on the state machine, if there exists an earlier being processed step 400, then all the state contexts visited so far during processing of the earlier event are detached—step 420.

The original state the state machine was in during the reception of the previous event (denoted state x in FIG. 4) is restored in step 430.

The new event is then processed from that state in step 440.

Figure 4B:
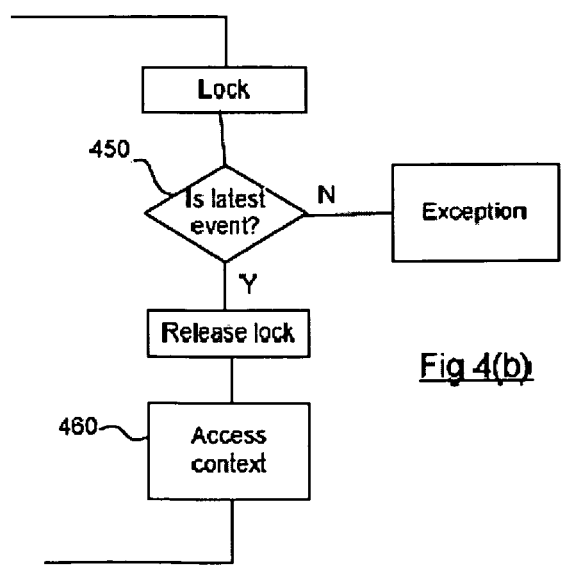

FIG. 4(b) illustrates a process that is carried out each time an event being processed by the state machine controller accesses a state context object. A lock is set in step 450, then a check is made in step 460 whether the event is the latest event received by the state machine controller. If so, then the lock is released and the state context object may be accessed normally. If not then the thread processing the event is sent an exception.

This has the consequence that where receipt of a later event has caused the process described in relation to steps 420 and 430 of FIG. 4(a) to be carried out, no further state contexts can be visited by the thread that is processing an earlier event.

It is up to the application level processing to ensure that the cancellation of the earlier event does not harm the consistency of external data handled by the application, for example in a database 160. It will be understood that the above-described techniques serve to ensure the protection of the state machine data structures (including user-supplied state data).

It will be appreciated that commercialised forms of the present embodiment would in practice take the form of a set of computer programs adapted to run on general-purpose computing platforms within general-purpose operating environments such as are provided by the Microsoft Windows, Linux or HP-UX operating systems and their related programming libraries and tools. These programs may be marketed in the form of suitably coded computer program products including program code elements that implement the functionality described. It will be appreciated though that the techniques described may equally be implemented as special purpose hardware or any combination of software, hardware and/or firmware. The techniques described have been primarily developed in the context of a web server where responses generated by the interactive system are web pages. However, it will be understood that the same or similar techniques may also be applied to any similar or comparable interactive system.

The above discussion is meant to be illustrative of the principles and various embodiments of the present invention. Numerous variations and modifications in each of the illustrated examples will become apparent to those skilled in the art once the above disclosure is fully appreciated. It is intended that the following claims be interpreted to embrace all such variations and modifications.

The invention claimed is:

1. A method, comprising:
   storing a back-up copy of state contexts of one of more states of a state machine controller when the state machine controller starts processing a current event, wherein responses to a user are associated with states of a state machine, the state machine controller being arranged to change states of the state machine according to the processing of user-initiated events, the states having associated state context objects that store the state contexts of the states and can be accessed via the state machine controller;

determining in a critical section, during processing of the current event, whether another event was initiated at a later time than the current event;

restoring the state machine to a condition consistent with that immediately prior to processing of the current event;

carrying out a state transition according to the another event when a processing entity associated with the another event calls the state machine controller; and detaching the state context object accessed by the current event, via the state machine controller, if the another event was initiated at a later time than the current event, wherein the detaching comprises unlinking the state context object from its associated state.

2. A method as claimed in claim 1 wherein events are processed by processing entities separate from the state machine controller and wherein the determining is carried out whenever a processing entity associated with the another event calls the state machine controller.

3. A method as claimed in claim 1 wherein the processing entities for processing the events are separate threads.

4. An apparatus, comprising:

means for storing a back-up copy of state contexts of one of more states of the state machine controller when the state machine controller starts processing a current event, wherein responses to a user are associated with states of a state machine, the state machine controller being arranged to change states of the state machine according to the processing of user-initiated events, the states having associated state context objects that store the state contexts of the states and can be accessed via the state machine controller;

means for determining in a critical section, during processing of the current event, whether another event was initiated at a later time than the current event;

means for restoring the state machine to a condition consistent with that immediately prior to processing of the current event;

means for carrying out a state transition according to the another event when a processing entity associated with the another event calls the state machine controller; and means for detaching the state context object accessed by the current event, via the state machine controller, if the another event was initiated at a later time than the current event, wherein the detaching comprises unlinking the state context object from its associated state.

5. A method for operating a web server wherein responses are associated with states of a state machine, the method comprising:

processing events initiated by a user by a processing entity associated with each event;

under the control of a state machine control separate from the processing entities, changing states of the state machine according to the processing of the events, the state machine comprising nested states;

generating a response as a result of a transition into a state associated with the response;

determining, in a critical section during processing of a current event, whether the current event was initiated at an earlier time than another event and, if so, (i) restoring the state machine to a condition consistent with that immediately prior to processing of the current event, and then (ii) carrying out a state transition according to the another event, wherein the determination is carried out whenever the processing entity associated with the another event calls the state machine controller;

wherein the states have associated state context objects that can be accessed via the state machine controller and wherein each time an event causes access to a state context object via the state machine controller, determining whether the event was initiated at an earlier time than initiation of a second current event and, if so, terminating the processing of the event calling the state machine controller and detaching the state context object accessed by the event, wherein the detaching comprises unlinking the state context object from its associated state.

6. A method as claimed in claim 5 wherein the web server is a multithreaded system and the processing entities for processing the events are separate threads.

* * * * *

UNITED STATES PATENT AND TRADEMARK OFFICE
CERTIFICATE OF CORRECTION

PATENT NO.        : 8,458,336 B2
APPLICATION NO.   : 11/411997
DATED             : June 4, 2013
INVENTOR(S)       : Raphael Manfredi et al.

It is certified that error appears in the above-identified patent and that said Letters Patent is hereby corrected as shown below:

In the Claims

In column 6, line 62, in Claim 1, after "one" delete "of" and insert -- or --, therefor.

In column 7, line 27, in Claim 4, after "one" delete "of" and insert -- or --, therefor.

Signed and Sealed this
Fifth Day of November, 2013

Teresa Stanek Rea
*Deputy Director of the United States Patent and Trademark Office*